US007908555B2

(12) United States Patent
Zellner

(10) Patent No.: US 7,908,555 B2
(45) Date of Patent: Mar. 15, 2011

(54) REMOTE CONTROL HAVING MULTIPLE DISPLAYS FOR PRESENTING MULTIPLE STREAMS OF CONTENT

(75) Inventor: Samuel N. Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 401 days.

(21) Appl. No.: 11/142,106

(22) Filed: May 31, 2005

(65) Prior Publication Data

US 2006/0271968 A1 Nov. 30, 2006

(51) Int. Cl.
*G06F 3/00* (2006.01)
(52) U.S. Cl. .......................... 715/718; 715/716; 715/717
(58) Field of Classification Search ................... 715/718, 715/716, 717; 345/169
See application file for complete search history.

(56) References Cited

U.S. PATENT DOCUMENTS

| | | | |
|---|---|---|---|
| 5,014,125 A | 5/1991 | Pocock et al. | |
| 5,031,046 A | 7/1991 | Bruggemann | |
| 5,128,987 A * | 7/1992 | McDonough et al. ... | 379/102.03 |
| 5,442,390 A | 8/1995 | Hooper et al. | |
| 5,490,208 A | 2/1996 | Remillard | |
| 6,097,441 A * | 8/2000 | Allport .......................... | 348/552 |
| 6,144,967 A | 11/2000 | Nock | |
| 6,201,562 B1 | 3/2001 | Lor | |
| 6,323,911 B1 | 11/2001 | Schein | |
| 6,445,933 B1 | 9/2002 | Pettit | |
| 6,496,122 B2 * | 12/2002 | Sampsell .................. | 340/825.69 |
| 6,567,854 B1 * | 5/2003 | Olshansky et al. ........... | 709/229 |
| 6,567,984 B1 | 5/2003 | Allport | |
| 6,882,326 B2 * | 4/2005 | Hirayama et al. ............. | 345/1.1 |
| 6,901,240 B2 | 5/2005 | Tokoro | |
| 7,075,540 B2 * | 7/2006 | Yuasa ........................... | 345/502 |
| 7,095,402 B2 | 8/2006 | Kunii et al. | |
| 7,224,936 B2 | 5/2007 | Pearson | |
| 7,324,168 B2 | 1/2008 | Griesau et al. | |
| 2001/0013125 A1 | 8/2001 | Kitsukawa et al. | |
| 2001/0019326 A1 | 9/2001 | Yuasa | |
| 2001/0040925 A1 | 11/2001 | Abelard et al. | |
| 2002/0031120 A1 | 3/2002 | Rakib | |
| 2002/0149699 A1 | 10/2002 | Mizobuchi et al. | |
| 2002/0149705 A1 | 10/2002 | Allen et al. | |
| 2002/0162116 A1 | 10/2002 | Read et al. | |

(Continued)

OTHER PUBLICATIONS

Tandy Corporation, "owner's Manual 8-IN-1 Universal remote control", 1990.

*Primary Examiner* — Steven P Sax
*Assistant Examiner* — Andrey Belousov
(74) *Attorney, Agent, or Firm* — Scott P. Zimmerman, PLLC

(57) ABSTRACT

Methods, devices, and computer program products describe a remote control for consumer electronics devices. The remote control has multiple transceivers simultaneously receiving multiple streams of content, and multiple displays simultaneously presenting the streams of content. The remote control includes means for switching between multiple sources for each stream of content displayed on each display. The multiple sources may include wireless content from a wireless source, cable content from a cable service provider, satellite content from a satellite service provider, broadband content from a broadband service provider, and local content from a local source. The remote control also has a communication mode when a voice over internet protocol telephone call is received. One of the transceivers terminates its stream of content and a processor mutes an audible portion of all other streams of content, and the transceiver begins receiving the communication.

16 Claims, 17 Drawing Sheets

U.S. PATENT DOCUMENTS

| | | |
|---|---|---|
| 2002/0172017 A1 | 11/2002 | Tarnowski et al. |
| 2003/0034957 A1 | 2/2003 | Dubil et al. |
| 2003/0038849 A1 | 2/2003 | Craven et al. |
| 2003/0041104 A1 | 2/2003 | Wingard et al. |
| 2003/0079020 A1 | 4/2003 | Gourraud et al. |
| 2003/0188323 A1 | 10/2003 | Wittlinger |
| 2004/0008287 A1 | 1/2004 | Johnston et al. |
| 2004/0066308 A1 | 4/2004 | Sampsell |
| 2004/0067778 A1 | 4/2004 | Sata |
| 2004/0073716 A1 | 4/2004 | Boom et al. |
| 2004/0137929 A1 | 7/2004 | Jones et al. |
| 2004/0152414 A1 | 8/2004 | Wang |
| 2005/0111308 A1 | 5/2005 | Hosey |
| 2005/0132420 A1 | 6/2005 | Howard et al. |

* cited by examiner

REMOTE CONTROL HAVING MULTIPLE DISPLAYS FOR PRESENTING MULTIPLE STREAMS OF CONTENT This application relates to the commonly assigned U.S. application Ser. No. 11/004,305, Ser. No. 11/004,434 and Ser. No. 11/004,435, all filed Dec. 4, 2004, and incorporated herein by reference in their entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to computer graphics processing, to selective visual display systems, and to television. This application, more particularly, relates to videophones, plural display systems, and to receiver circuitry remote controls.

Remotely controlled electronic devices are a part of everyday life. Televisions are almost exclusively commanded using a remote control. Stereos, entertainment systems, and other audio components are also often commanded using a remote control. Because so many electronic devices are remotely controlled, so-called universal remotes are now offered that integrate command functions for several devices into a single remote control.

Despite the widespread use of the remote controls, they have not evolved to take advantage of the advance of digital data transmission and packet protocols. As more and more types of content are being digitally transmitted using packetizing protocols, it would be desirable to have remote controls that can make use of multiple streams of content.

SUMMARY

According to exemplary embodiments, a remote control is provided that takes advantage of the advances in digital data transmission. This remote control has the capability to receive multiple streams of content. The remote control also has the ability to display each stream of content in a dedicated display area. This remote control, then allows a user to make multiple content selections and to simultaneously view each selection of content on a different display area. The user, for example, may receive and view a movie on one display, view another movie on another display, and even surf the Internet using still another display. The remote control even has communications capabilities, thus allowing the user to send and receive electronic communications (e.g., voice calls, emails, instant messages). The remote control also allows remote command of consumer electronics devices.

According to exemplary embodiments, a remote control for consumer electronics devices is described. The remote control has multiple transceivers simultaneously receiving multiple streams of content. The remote control also has multiple displays simultaneously presenting the streams of content. The remote control includes means for switching between multiple sources for each stream of content displayed on each display. The multiple sources may include wireless content from a wireless source, cable content from a cable service provider, satellite content from a satellite service provider, broadband content from a broadband service provider, and local content from a local source. The remote control also has a communication mode when a voice over internet protocol telephone call is received. One of the transceivers terminates its stream of content and a processor mutes an audible portion of all other streams of content, and the transceiver begins receiving the communication.

According to more exemplary embodiments, a device is disclosed that remotely controls a consumer electronics device. A first transceiver receives a stream of content, while a second transceiver simultaneously receives an incoming communication. A first display displays the stream of content, while a second display displays a video portion of the communication. The device also includes means for audibly presenting an audible portion of the communication. When the communication is received, a processor mutes the means for audibly presenting the stream of content, such that only the communication is audibly presented.

According to still more exemplary embodiments, a device is disclosed that remotely controls a consumer electronics device. The device comprises a first transceiver receiving a stream of content and a second transceiver simultaneously receiving a second stream of content. A first display displays the first stream of content, while a second display simultaneously displays the second stream of content. When a processor receives notification of an incoming voice call, the processor mutes an audible portion of the first stream of content. The processor causes a control signal to be sent that mutes an audio output of the consumer electronic device. The processor commands the second transceiver to receive the incoming voice call, and the processor processes an audible portion of the incoming voice call.

According to still more exemplary embodiments, a method is disclosed for remotely controlling consumer electronics devices. Multiples streams of content are simultaneously received at a transceiver. The streams of content are simultaneously presented at multiple display areas. Display of the received multiple streams of content is controlled by a processor on the multiple display areas.

According to even more exemplary embodiments, a computer program product is disclosed for remotely controlling consumer electronics devices. The computer program product comprises a computer-readable medium storing computer code. The computer code simultaneously receives at a transceiver multiple streams of content. The computer code simultaneously presents the streams of content at multiple display areas. The computer code controls display of the received multiple streams of content on the multiple display areas.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

These and other features, aspects, and advantages of the embodiments of the present invention are better understood when the following Detailed Description is read with reference to the accompanying drawings, wherein.

DETAILED DESCRIPTION

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that exemplary hardware, software, processes, methods, and/or operating systems described herein are for illustrative purposes and, thus, are not intended to be limited to any particular named manufacturer.

Exemplary embodiments describe a multi-display remote control. This remote control has the capability to receive multiple streams of content. The remote control, however, also has multiple displays, thus permitting each stream of content to be displayed on a dedicated display device. This remote control, then allows a user to make multiple content selections and to simultaneously view each selection of content on a different display. The user, for example, may receive and view a movie on one display, view another movie on another display, and even surf the Internet using still another display. The remote control even has communications capabilities, thus allowing the user to send and receive electronic communications (e.g., voice calls, emails, instant messages). The remote control also allows remote command of consumer electronics devices.

Figure 1:
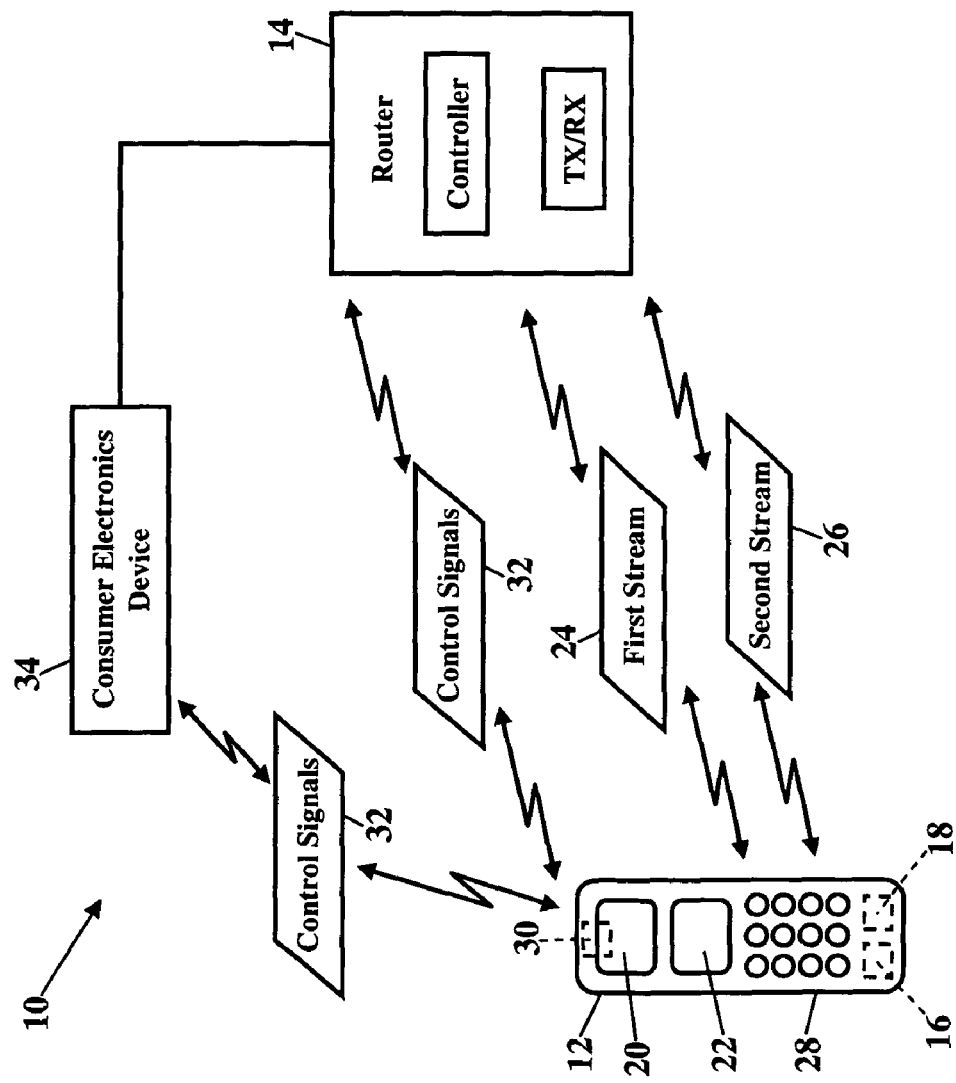
FIG. 1 is a simplified schematic illustrating exemplary embodiments.

FIG. 1 is a simplified schematic illustrating an exemplary remote control system 10 according to an exemplary embodiment. The remote control system 10 comprises a remote control 12 and a wireless router 14. The remote control 12 and the wireless router 14 each have one or more transceivers simultaneously sending and receiving multiple streams of content. The remote control 12 also has multiple displays simultaneously presenting the streams of content. FIG. 1, for example, illustrates a first transceiver 16, a second transceiver 18, a first display 20, and a second display 22. The first transceiver 16 wirelessly receives a first stream 24 of content from the wireless router 14. The second transceiver 18 is capable of simultaneously receiving a second stream 26 of content from the wireless router 14. The first display 20 may be dedicated to displaying the first stream 24 of content, while the second display 22 may be dedicated to simultaneously displaying the second stream 26 of content. While only two transceivers and two displays are shown, the remote control 12 may have more than two transceivers and/or more than two displays. That is, the remote control 12 may have any number of transceivers and/or displays that receive multiple streams of content. Moreover, the first transceiver 16 may simultaneously receive multiple streams of content (such as the first stream 24 of content from the wireless router 14 and the second stream 26 of content from the wireless router 14).

The multiple displays may have any configuration and construction. The multiple displays (e.g., 20 and 22) are shown as physically separate display devices that are each housed within the same outer casing 28 for the remote control 12. The multiple displays may alternatively be a single display device that is partitioned into separate regions or areas. The multiple displays may utilize any display device technology, such as a cathode-ray, a liquid crystal, a diode, one or more micromirrors, or plasma. Although the multiple displays may have any configuration and construction, the capability of visually producing full-motion video is desirable to maximize the types of content the user may wish to receive.

According to an exemplary embodiment, the remote control 12 also includes means for audibly presenting one or more streams of content. As the following paragraphs will explain, the means for audibly presenting the streams of content may allow a user to adjust the volume of each individual stream of content. A selector switch or menu (as will be later shown) allows the user to select an audio portion of a particular stream of content, and the user may then individually adjust the volume of that audio portion. The means for audibly presenting the streams of content may alternatively only permit audibly producing one stream at a time. In this case, even though the remote control 12 receives multiple streams of content, and each stream may include its own audible portion, the remote control 12 will only audibly process one audio portion. The user selects which stream is to be audibly processed, and the remote control 12 audibly presents only that selected audio portion. An internal processor 30 ignores the audio portion of all other streams of content.

The remote control 12 displays multiple and separate streams of content. Because the remote control 12 is capable of simultaneously receiving and displaying multiple streams of content, a user may simultaneously view multiple streams of content. The user, for example, may receive and view content from a cable service provider on the first display 20, while the user views content from a satellite service provider on the second display 22. As the following paragraphs will explain, however, the user may additionally or alternatively select content from other sources, such as broadcast/wireless sources, wireline broadband service providers, and local sources. Any of the content sources could provide access to a distributed computing network, such as the Internet. Whatever the sources for the content, the remote control 12 receives and displays multiple streams of content from multiple sources.

According to an exemplary embodiment, the remote control 12 also wirelessly sends control signals 32. These control signals 32 may be directly communicated to a consumer electronic device 34, and/or the control signals 32 may be communicated via the wireless router 14. As those of ordinary skill in the art appreciate, the control signals 32 allow the remote control 12 to remotely command the selection of channel, volume, settings, and other features. The consumer electronic device 34, for example, may be any television, computer, monitor, digital recorder, appliance, and/or audio component. The consumer electronic device 34 may be an oven, a refrigerator, a washer/dryer, a lawnmower, an automobile, or any other system or device capable of remote control. The control signals 32 may be sent by any of the multiple transceivers. The remote control 12 may remotely control multiple consumer electronics devices and includes means for switching between control modes for each consumer electronics device. The remote control 12, for example, may have a television mode, an audio component mode, a set-top box mode, a digital recorder mode, or other modes for other consumer electronics devices. The means for switching between control modes may include a switch having positions or selections for each mode. The means for switching between control modes may additionally or alternatively have graphical user interfaces or menus that allow a user to select a mode of operation. The means for switching between control modes may alternatively or additionally include a button that is pushed to select a mode of operation. The control signals 32 may be communicated using any portion of the electromagnetic spectrum (e.g., the ISM band, the RF band, and/or the infrared band) and may utilize any signaling standard (such as the BLUETOOTH® standard, the I.E.E.E. 802 family of standards, and/or the GSM/CDMA/TDMA standards). The remote control mode of operation, however, is known to those of ordinary skill in the art and will not be further described. If the reader desires a more detailed explanation, the reader is directed to the following sources: U.S. Pat. No. 5,031,046 to Brüggemann (Jul. 9, 1991); U.S. Pat. No. 6,097,441 to Allport (Aug. 1, 2000); U.S. Pat. No. 6,323,911 to Schein et al. (Nov. 27, 2001); U.S. Pat. No. 6,496,122 to Sampsell (Dec. 17, 2002); U.S. Pat. No. 6,567,984 to Allport (May 20, 2003); U.S. Patent Application Publication 2001/0019326 to Yuasa (Sep. 6, 2001); and U.S. Patent Application Publication 2004/0067778 to Sata et al. (Apr. 8, 2004), with each incorporated herein by reference.

The wireless router 14 routes multiple streams of content to and from the remote control 12. The wireless router 14, as earlier described, wirelessly transmits the first stream 24 of content and the second stream 26 of content to the remote control 12. Each stream of content may have any construction, formatting, and content. Each stream of content, although not required, commonly has a packetized construction. When a stream of content is packetized, the wireless router 14 inspects each packet (perhaps using a header portion) and routes the packet to its intended destination. Packets destined for the remote control 12, for example, are routed by the wireless router 14 to the remote control 12. Those packets destined for the remote control 12 are wirelessly communicated to one or more of the multiple transceivers and displayed by one or more of the multiple displays. Packets destined for the consumer electronic device 34 are routed by the wireless router 14 to the consumer electronic device 34. As those of ordinary skill in the art will appreciate, the router 14, of course, may route packets to other destination. The wireless router 14 and the remote control 12 may utilize any packetizing scheme. Because packetizing schemes are known to those of ordinary skill in the art, packetizing schemes are not further discussed.

Figure 2:
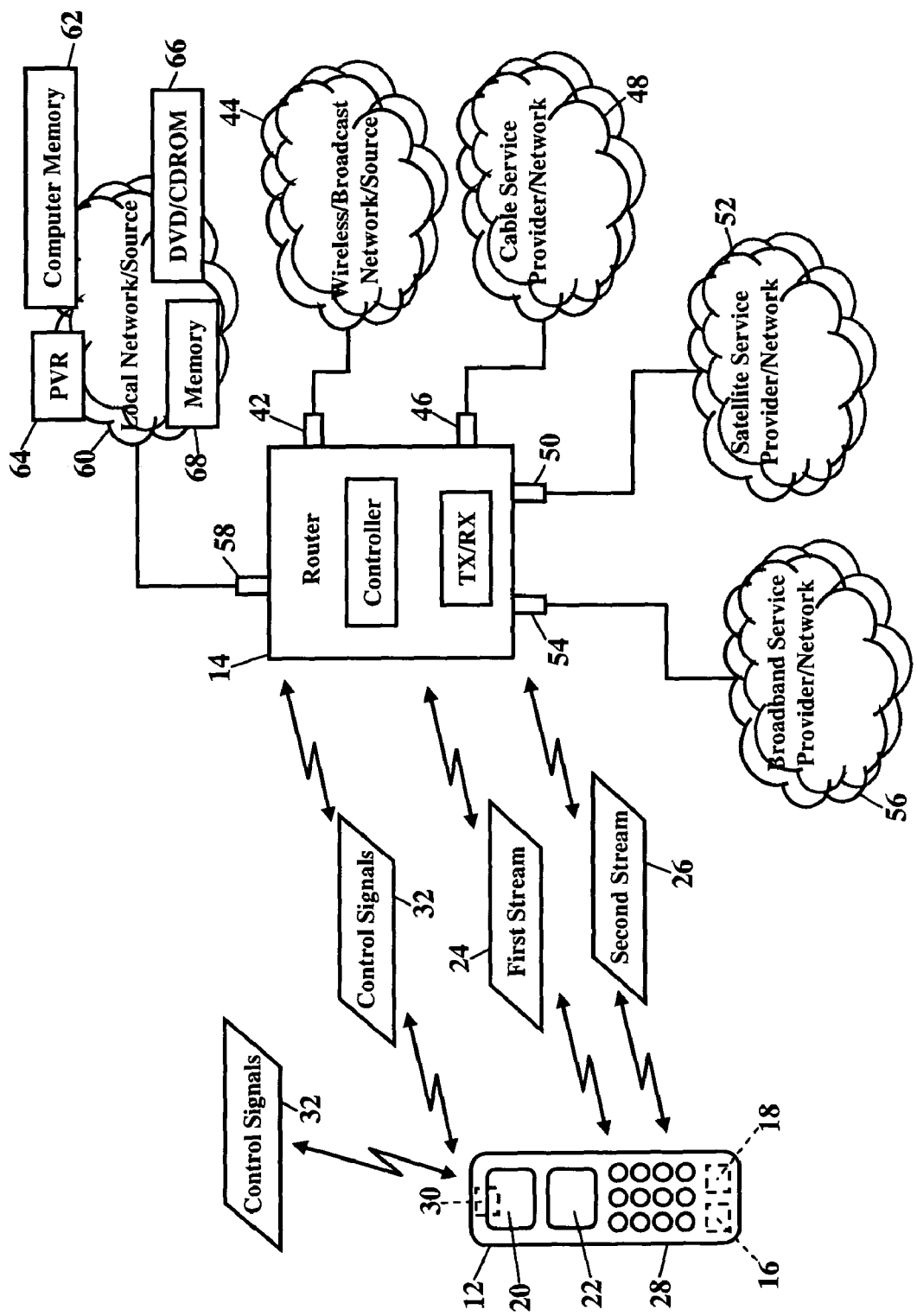
FIG. 2 is a more detailed schematic illustrating exemplary embodiments.

FIG. 2 is a more detailed schematic illustrating exemplary embodiments. Here the wireless router 14 has one or more inputs for receiving content from multiple sources. FIG. 2, for example, shows the wireless router 14 having a first input 42 receiving data from a wireless/broadcast source 44 and a second input 46 receiving data from a cable service provider 48. The wireless router 14 also has a third input 50 receiving data from a satellite service provider 52 and a fourth input 54 receiving data from a broadband service provider 56. The wireless router 14 may also have one or more auxiliary inputs 58 receiving data from local sources 60 (such as computer memory 62, a personal digital recorder (PVR) 64, a DVD/CDROM drive 66, or any other memory storage device 68).

The remote control 12 also includes means for switching between multiple sources of content. Because the wireless router 14 has access to many sources of content, from one or more content providers, the remote control 12 may wirelessly receive multiple streams of content from multiple sources. That is, the means for switching between multiple sources of content allows the user of the remote control 12 to select a source for the first stream 24 of content, for the second stream 26 of content, and for any additional streams of content. Either stream 24 or 26 of content may be selected from i) wireless content from the wireless/broadcast source 44, ii) cable content from the cable service provider 48, iii) satellite content from the satellite service provider 52, iv) broadband content from the broadband service provider 56, and v) local content from the local source 60. The wireless content from the wireless/broadcast source 44 may be communicated using any portion of the electromagnetic spectrum (e.g., broadcast television stations, the ISM band, the RF band, or the infrared band) and may utilize any signaling standard. The cable service provider 48 and the broadband service provider 56 provide cable/broadband content via copper wires (e.g., telephone/DSL), fiber optics, coaxial cables, and/or hybrid constructions.

Figure 3:
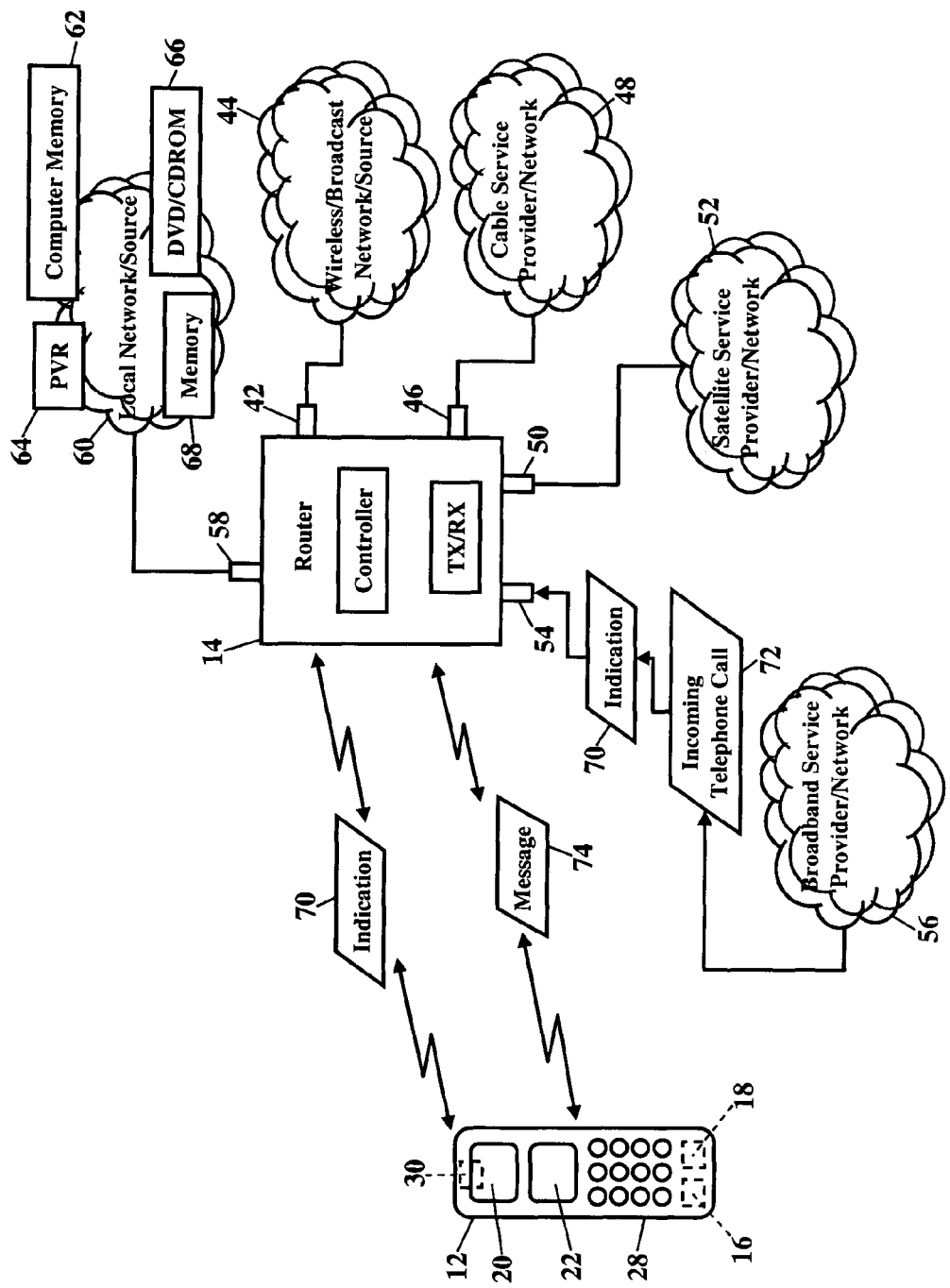
FIGS. 3-6 are schematics illustrating a communications mode of operation, according to exemplary embodiments.

FIGS. 3-6 are schematics illustrating a communications mode of operation, according to exemplary embodiments. Here remote control 12 operates as a wireless communications device and receives an indication 70 of an incoming communication. The incoming communication may be a voice call (such as an Internet Protocol (IP) telephone call), an email, an instant message, a page, or any other form of an electronic communication. FIG. 3 illustrates, for example, the wireless router 14 receiving an indication 70 of an incoming I.P. telephone call 72. The indication 70 and the incoming I.P. telephone call 72 are shown communicating from the broadband service provider 56. That is, the broadband service provider 56 delivers the I.P. telephone call 72. The incoming I.P. telephone call 72, and the indication 70, however, may be received from any source, such as the wireless/broadcast source 44, the cable service provider 48, the satellite service provider 52, and/or the local source 60. The indication 70 may be any signal, message, or data that alerts or informs the wireless router 14 of the incoming communication. The wireless router 14 then informs the remote control 12 of the incoming telephone call. The wireless router 14 may simply forward the indication 70 to the remote control 12, or the wireless router 12 may construct and send a message 74 that informs the remote control 12. However the remote control 12 is notified of the incoming communication, the processor 30 causes the remote control 12 to enter the communications mode of operation.

Figure 4:
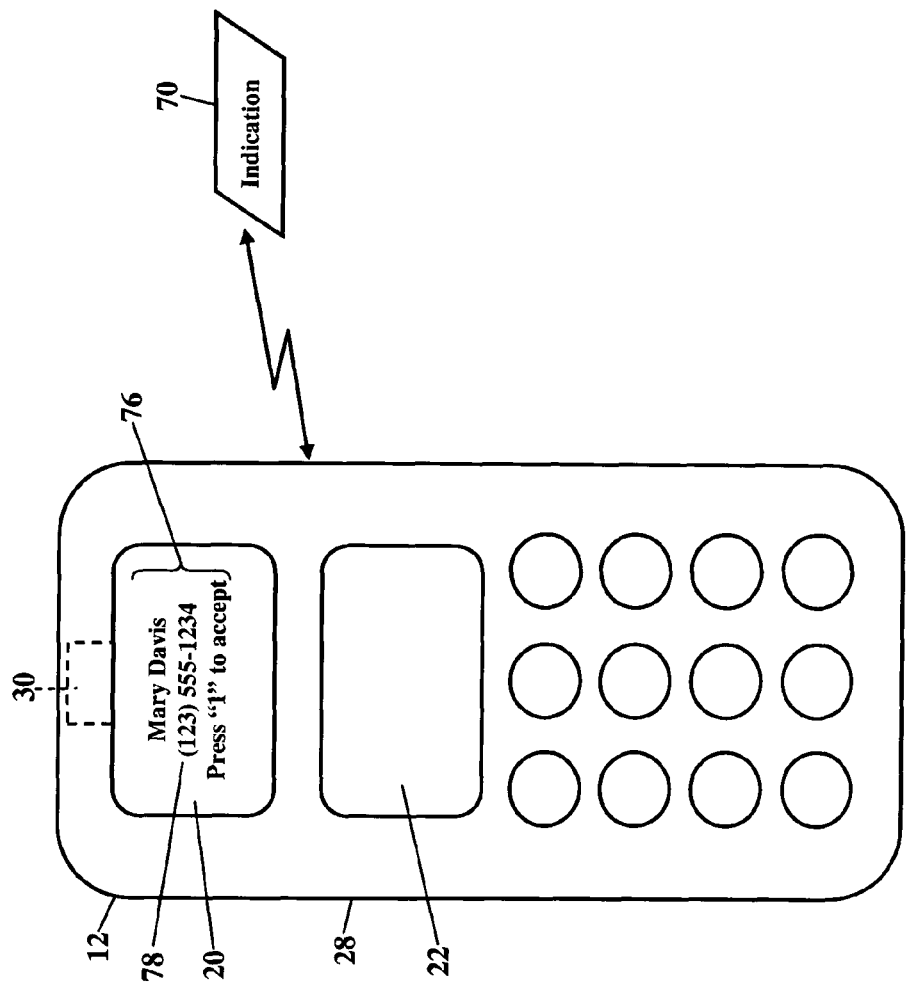
Figure 5:
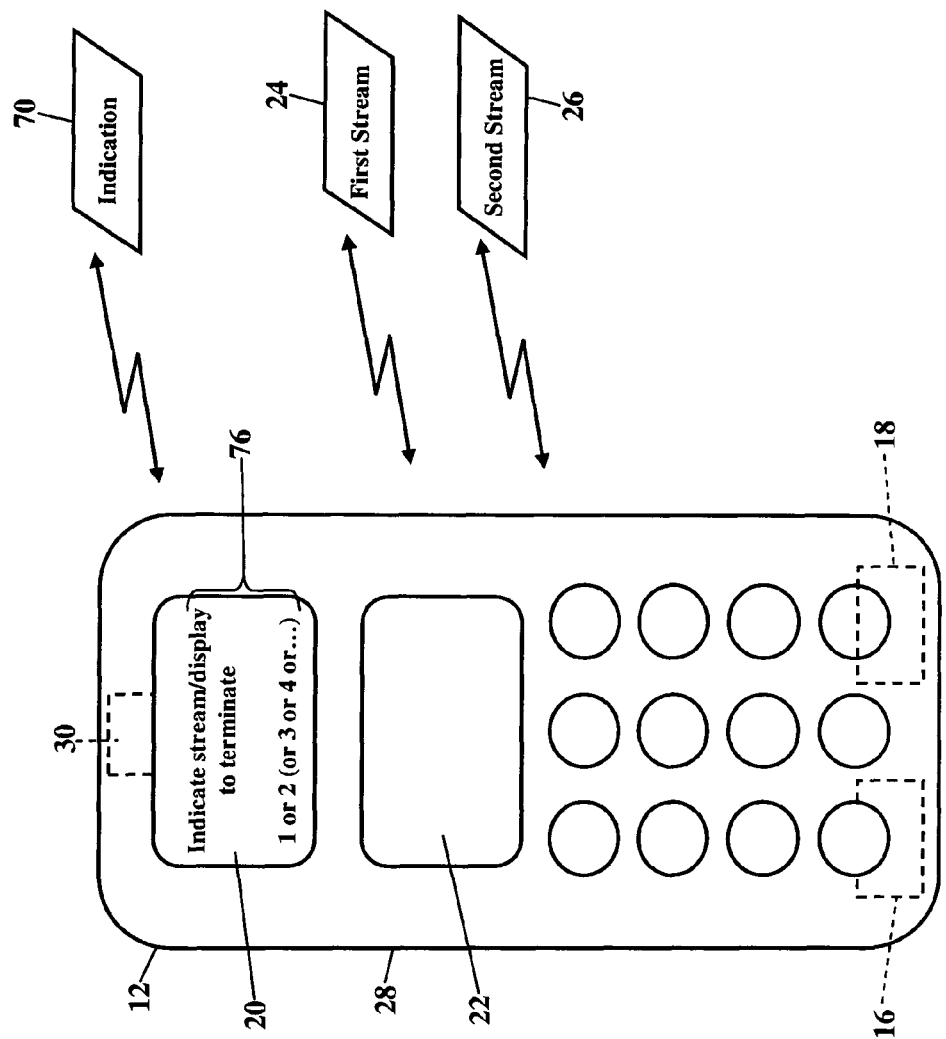

FIGS. 4 and 5 are schematics illustrating a prompt 76, according to exemplary embodiments. When the remote control 12 operates in the communications mode, the remote control 12 operates as a wireless communications device. That is, remote control 12 receives the incoming communication, and the remote control 12 may even permit two-way communication between the user-recipient and the sender of the incoming communication. When the remote control 12 receives the indication (shown as reference numeral 70 in FIG. 3), the processor 30 prepares and presents the prompt 76. The processor 30 causes the prompt 76 to be displayed on the one or more displays (e.g., 20 and/or 22). The prompt 76 visually informs a user of the incoming communication. The processor 30 may also cause an audible alert (e.g., a buzz or ring) and/or a tactile alert (e.g., vibration) to be produced that additionally or alternatively alerts the user to the incoming communication. The prompt 76 may also visually display a communications address 78 of the sender of the communication. The communications address 78 may be the sender's email address, the sender's page address, a caller's telephone number, or any other communications address. The prompt 76 urges the user to accept the incoming communication. As FIG. 4 illustrates, the prompt 76 may ask the user to accept the incoming communication using a predetermined button or sequence of buttons. If, however, the user fails to accept the incoming communication, or affirmatively declines, the processor 30 will not take action to receive the incoming communication.

FIG. 5 further illustrates the prompt 76. According to an exemplary embodiment, if the user accepts the incoming communication, the processor 30 determines whether a transceiver (e.g., 16 or 18) is available to receive the incoming communication. If all the transceivers are busy/occupied (e.g., engaged in a session or other reception/transmission), then one of the streams of content may be terminated in order to "free up" a transceiver. One of the transceivers, in other words, terminates its stream of content and, instead, receives the incoming communication (shown as the incoming telephone call 72 in FIG. 3). If, however, a transceiver is idle (that is, not currently receiving a stream of content), then the processor 30 commands that idle transceiver to handshake with the wireless router 14 and begin receiving the incoming communication.

When all transceivers are busy, the user may select what stream of content is terminated. In this case, when the indication 70 is received, the processor 30 is informed of the incoming communication. The processor 30 also knows the status of each transceiver (e.g., 16 and 18) and knows that neither is idle. That is, the first transceiver 16 is wirelessly receiving the first stream 24 of content, and the second transceiver 18 is simultaneously receiving the second stream 26 of content. According to an exemplary embodiment, because neither transceiver 16 or 18 is idle, the processor 30 terminates at least one stream of content and, instead, receives the incoming communication.

The processor 30, then, prompts the user to select which stream is dropped or terminated. If the user wants to receive the incoming communication, the prompt 76 may also request to terminate a particular stream of content. As FIG. 5 illustrates, the prompt 76 asks the user to indicate which stream of content is terminated. The user responds and indicates which of the multiple streams (e.g., 24 or 26) should be terminated. A simpler nomenclature, however, might be "display" instead of "stream." The user may prefer to indicate what content, currently displayed on a particular display, is to be terminated. The user, for example, may indicate that "display 1" or "top display" or "main display" is terminated. Similarly, the user may indicate that "Casablanca" or "Singing in the Rain" or other content title is terminated. However each stream of content is identified, the prompt 76 asks the user to indicate which stream of content is terminated.

Figure 6:
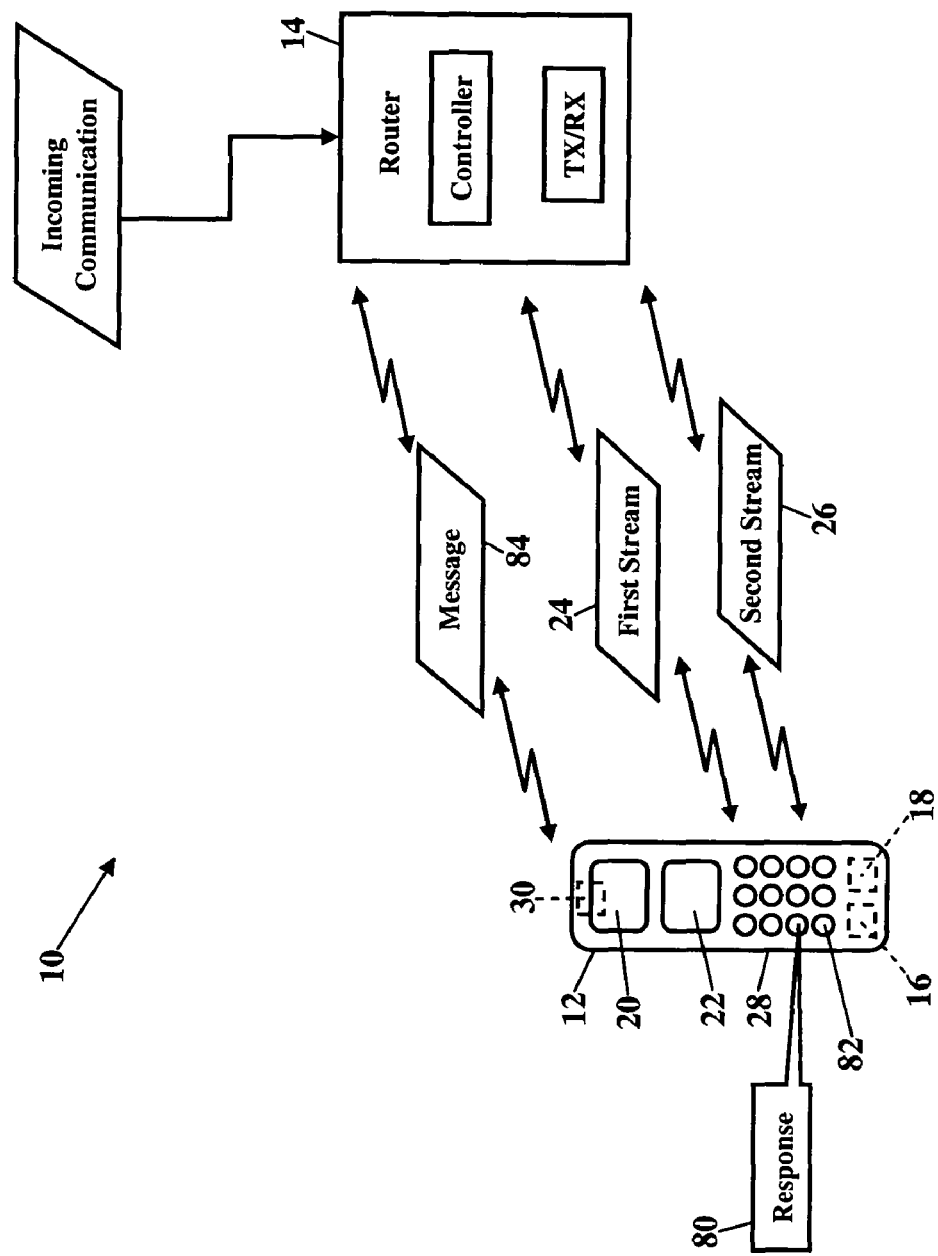

FIG. 6 is a schematic illustrating the user's response 80, according to exemplary embodiments. The user may enter the response 80 using a keypad 82, or the user may tap or otherwise tactilely indicate (e.g., via a pressure sensitive screen) the response 80. If the user accepts the incoming communication, the processor 30 first terminates whichever stream of content (e.g., 24 or 26) that the response 80 specifies. The remote control 12 sends a message 84 that causes the wireless router 14 to terminate communication of the chosen stream, and the message 84 also instructs the wireless router 14 to begin wirelessly communicating the incoming communication.

Figure 7:
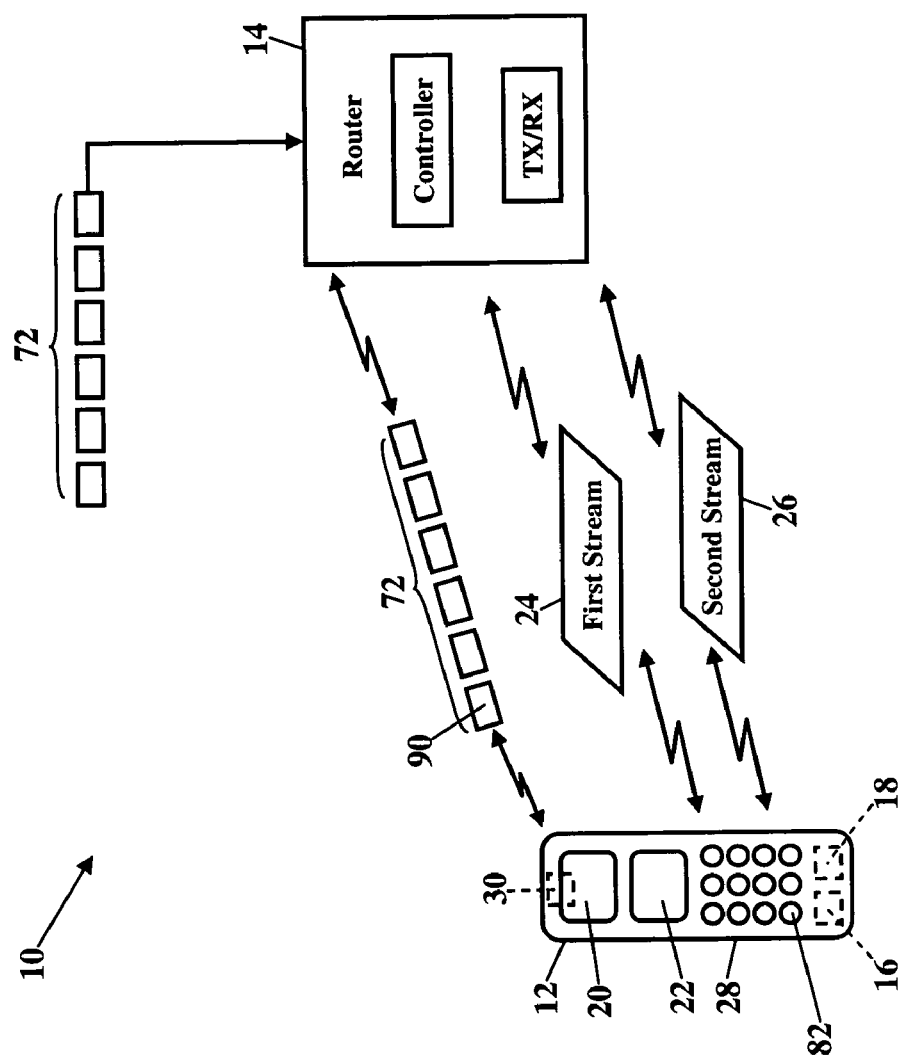
FIG. 7 is a schematic illustrating features for audible, incoming communications, according to more exemplary embodiments.

FIG. 7 is a schematic illustrating features for audible, incoming communications, according to exemplary embodiments. As the remote control 12 wirelessly receives the incoming communication (e.g., the telephone call 72), the processor 30 inspects each packet for audible portions 90 of content. According to an exemplary embodiment, if the incoming communication includes the audible portions 90, the processor 30 gives audible precedence to the incoming communication. That is, the processor 30 stops processing, or "mutes," any audible portions of the other, simultaneously received multiple streams of content (such as audible portions of the first stream 24). The processor 30, instead, chooses to only audibly process the incoming communication. The processor 30 processes all the video portions of the multiple streams of content, including the incoming communication (if present). The processor 30, however, only processes the audible portion of the incoming communication. Here, then, the first display 20 displays the video portion of the first stream 24 of content, and the second display 22 displays the video portion of the second stream 26 of content. The means for audibly presenting one or more streams of content, however, only produces the audible portion of the incoming communication. The user, then, may view both video portions on the respective displays 20 and 22, but the user may only audibly hear the incoming telephone call 72. The user may thus use the remote control 12 as a communications device and conduct a VoIP session with the caller. The user, at the same time, may view the video portions of the first stream 24 of content and the second stream 26 of content.

The remote control 12 may alternatively have a default configuration. In this embodiment, when the incoming communication is received, the processor 30 implements a default mode. The processor 30, as before, prompts the user to receive the incoming communication. If the user affirmatively accepts the incoming communication, the remote control 12 has a default setting when the incoming communication has both audible and video portions. This default configuration visually presents the video portion of the incoming communication on a particular display. The incoming communication, for example, is always visually presented on the second display 22. If the second display 22 is currently occupied with a stream of content, the processor 30 automatically instructs the corresponding transceiver (such as the second transceiver 18) to terminate that stream of content. The processor 30 instructs the second transceiver 18 to handshake with the wireless router 14 and to begin receiving the incoming communication. Here, then, the user need not indicate which of the multiple streams should be terminated. The incoming communication is, instead, automatically visually presented by the default display (such as the second display 22).

Figure 8:
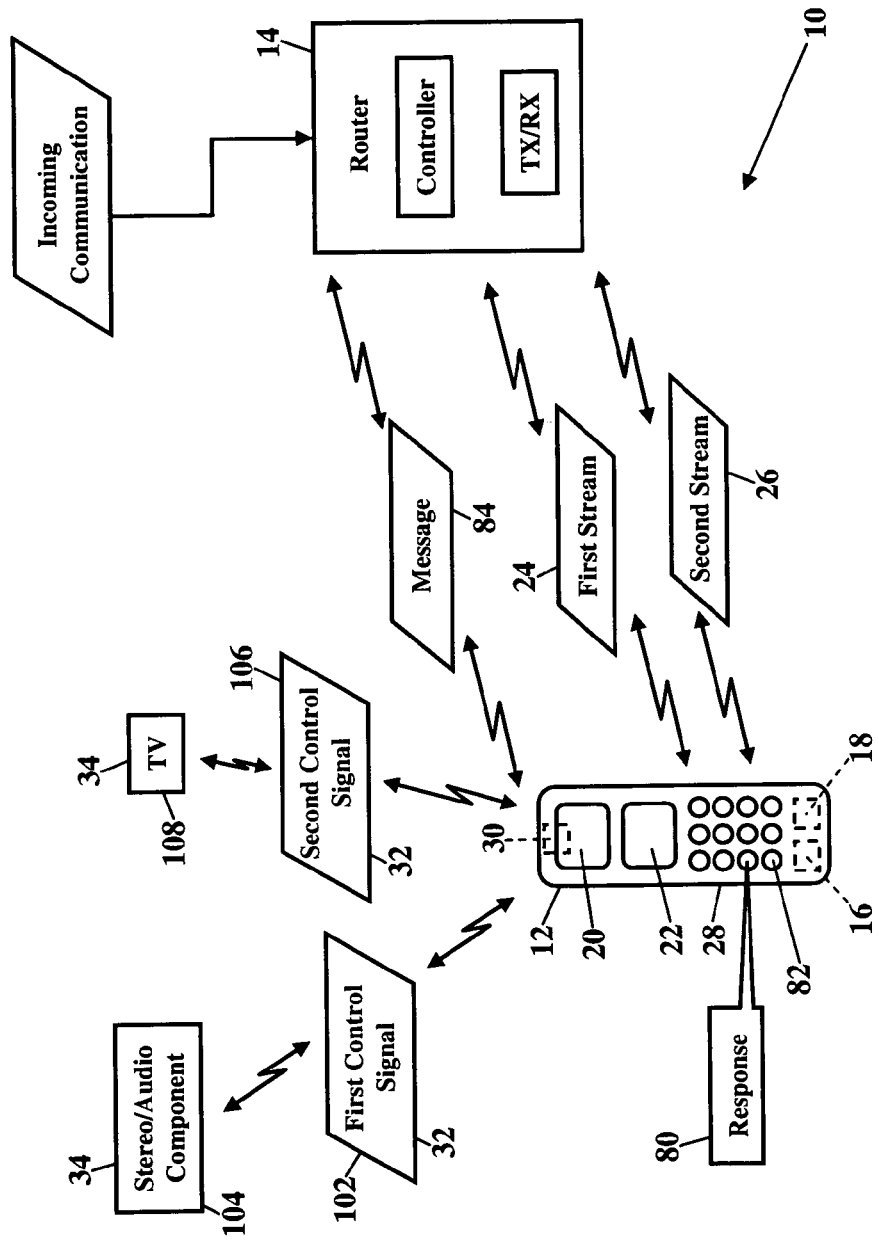
FIGS. 8 and 9 are schematics further illustrating the communications mode, according to exemplary embodiments.

FIG. 8 is a schematic further illustrating the communications mode, according to exemplary embodiments. The processor 30, as before, prompts the user to receive the incoming communication. If the user responds and accepts the incoming communication, the remote control 12 sends the message 82 that instructs the wireless router 14 to begin wirelessly communicating the incoming communication. According to an exemplary embodiment, when the user accepts the incoming communication, the remote control 12 automatically creates a low-volume (or audio-silent) environment. For example, when the user accepts the incoming communication, here the remote control 12 automatically mutes one or more of the consumer electronics devices 34.

This is accomplished by the processor 30 sending one or more of the control signals 32 to instruct the consumer electronic device(s) 34 to mute its audio output. The processor 30, for example, causes a first control signal 102 to be sent that instructs an audio/stereo component 104 to mute its audio output. A second control signal 106 is also sent that instructs a television 108 to mute its audio output. For other consumer electronics that are controlled by the remote control 12, other control signals are sent to similarly mute audio outputs. In this manner, when the incoming communication is received by the remote control 12, the remote control 12 has automatically attempted to create a low-volume environment.

Figure 9:
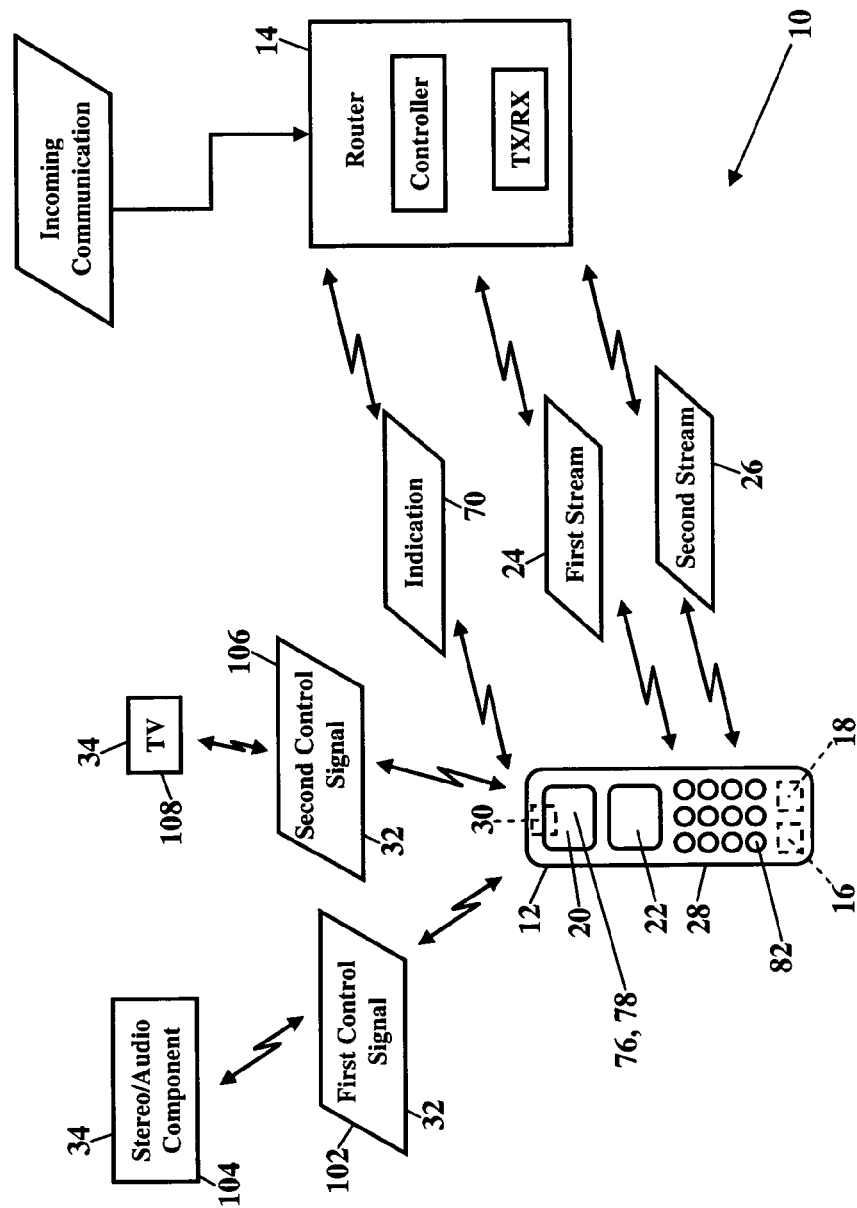

FIG. 9 is a schematic further illustrating the communications mode, according to exemplary embodiments. When the incoming communication is detected, the remote control 12 may first create the low-volume environment. The remote control 12 may mute the consumer electronics devices 34 before ringing or otherwise alerting of the incoming communication. The remote control 12, as before, receives the indication 70 of the incoming communication. The incoming communication may be any electronic communication, such as a voice call (such as an Internet Protocol (IP) telephone call), an email, an instant message, or a page. Here the remote control 12 first automatically mutes the one or more consumer electronics devices 34. The remote control 12 mutes the audio output from any consumer electronics devices, and then the processor 30 causes the audible alert (e.g., a buzz or ring) and/or the tactile alert (e.g., vibration). The processor 30 also causes the sender's communications address 78 to be displayed on any display. The remote control 12, then, first creates the low-volume (or audio-silent) environment before prompting the user to accept the incoming communication.

Figure 10:
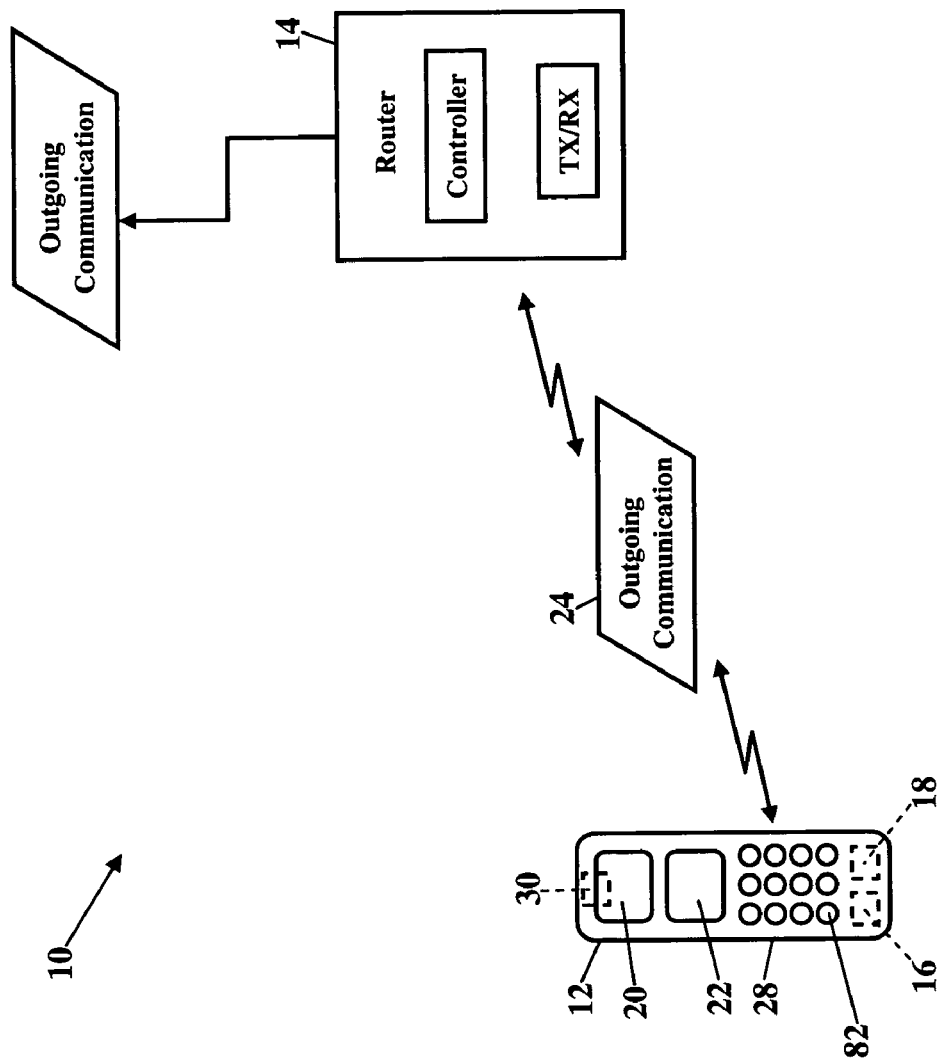
FIG. 10 is a schematic illustrating outgoing communication capabilities, according to exemplary embodiments.

FIG. 10 is a schematic illustrating outgoing communication capabilities, according to exemplary embodiments. The remote control 12 may also establish outgoing telephone calls, emails, instant messages, and other electronic communications. Because the remote control 12 operates as a wireless communications device, the remote control 12 is capable of initiating an outgoing communication 120. The remote control 12 may include a "talk" mode that causes any transceiver (e.g., 16 or 18) to initiate an outgoing voice call. The user may even use the keypad 82 to create a textual electronic message (such as an email or an instant message). The remote control 12 may include an input or interface for a keyboard that further helps the user create textual content for the outgoing communication 120. However the outgoing communication 120 is created, one or more of the remote control's transceivers wirelessly communicate the outgoing communication to the wireless router 14.

Figure 11:
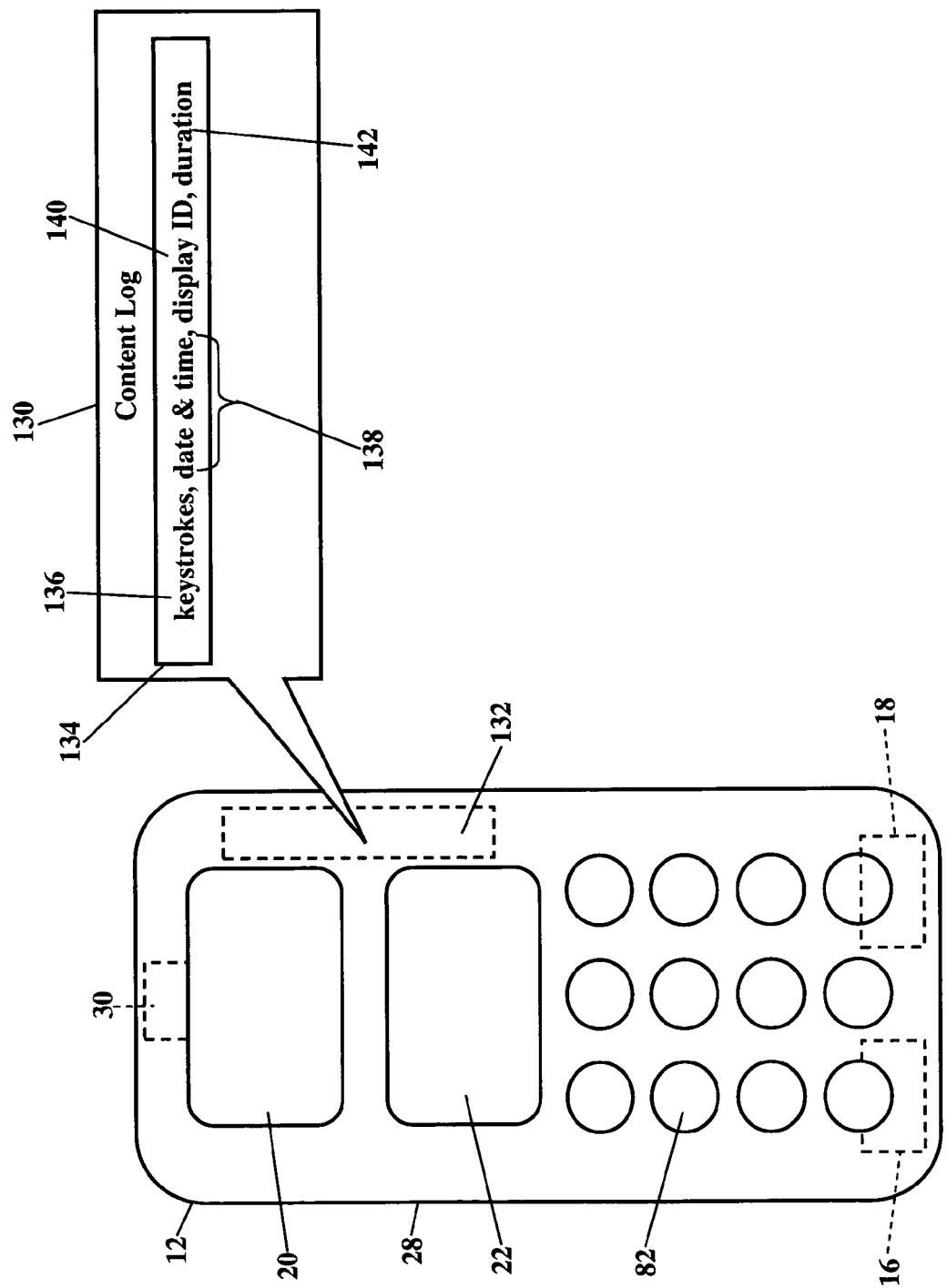
FIGS. 11-13 are schematics illustrating logs, according to more exemplary embodiments.

FIG. 11 is a schematic illustrating a content log 130, according to exemplary embodiments. The content log 130 is stored in a memory 132 of the remote 12. The content log 130 maintains a log of the content requested by the user. That is, as the user enters commands (such as by using the keypad 82) to select content, the content log 130 maintains an entry or record of each selection. When, for example, the user selects a stream of content, the content log 130 creates an entry 134 that describes that selection. The entry 134 stores the key strokes 136 that requested that content, and the entry 134 may also include a date and time tag 138. The entry 134 may also include an identifier 140 of the display to which the stream of content is dedicated. The entry 134 may also track the duration 142 of time that the requested content is received, processed, and/or displayed by the remote control 12. Because the content log 130 tracks the duration of each stream of content, the content log 130 thus reveals whether the requested content met the user's expectations. The content log 130 tracks any command or sequence of commands (e.g., volume, channel, display) that are entered using the keypad 82.

The remote control 12 has "learning" abilities. Because the content log 130 maintains a log of all the user's selections and/or commands, the remote control 12 may learn the user's preferences. The remote control's internal processor 30 may analyze the content log 130 and make selections on behalf of the user. The remote control 12 thus acts as a proxy for the user. The processor 30, for example, may determine from the content log 130 that a particular content is always selected at 8 PM on Tuesdays. The user may watch PBS's "NOVA" each week, and the content log 130 reflects this weekly, recurring content. The processor 30, then, may autonomously make that selection on behalf of the user. The processor 30 could even send control signals that instruct a television, computer, or other media device to power up and tune to, or request and receive, the recurring content. The processor 30 could even analyze the content log 130 and select the user's preferred volume setting, speaker selection, ambient lighting selection, and other controllable settings.

The remote control 12 may also analyze profiles for multiple users. Because the remote control 12 analyzes the content log 130 and makes selections, the remote control 12 may make selections based upon which user is currently using the remote. A household often has multiple users, and each user has their own content preferences. The remote control 12, then, may be configured for multiple profiles, with each profile associated with a particular user or group of users. The remote, optimally, would recognize which person is currently using the remote and select the corresponding profile. While a login and userID may be used to identify each user, some users may find such login requirements tedious. The remote control 12, however, may include a switch, menu, or other selector for choosing the current user. Each position of the switch, or each selection in the menu, would correspond to a different user and their respective profile. A password may also be used by any user to help restrict access to their profile. The processor 30 may even use biometrics (e.g., fingerprint information) that also identifies the user. This biometrics could additionally or alternatively include retinal information, voice/audio information, DNA/RNA information, and other identifying information. Once the user is known, the processor 30 would access and analyze the content log 130 that corresponds to the user's profile. The processor 30, then, may autonomously make selections and settings based on that profile.

Figure 12:
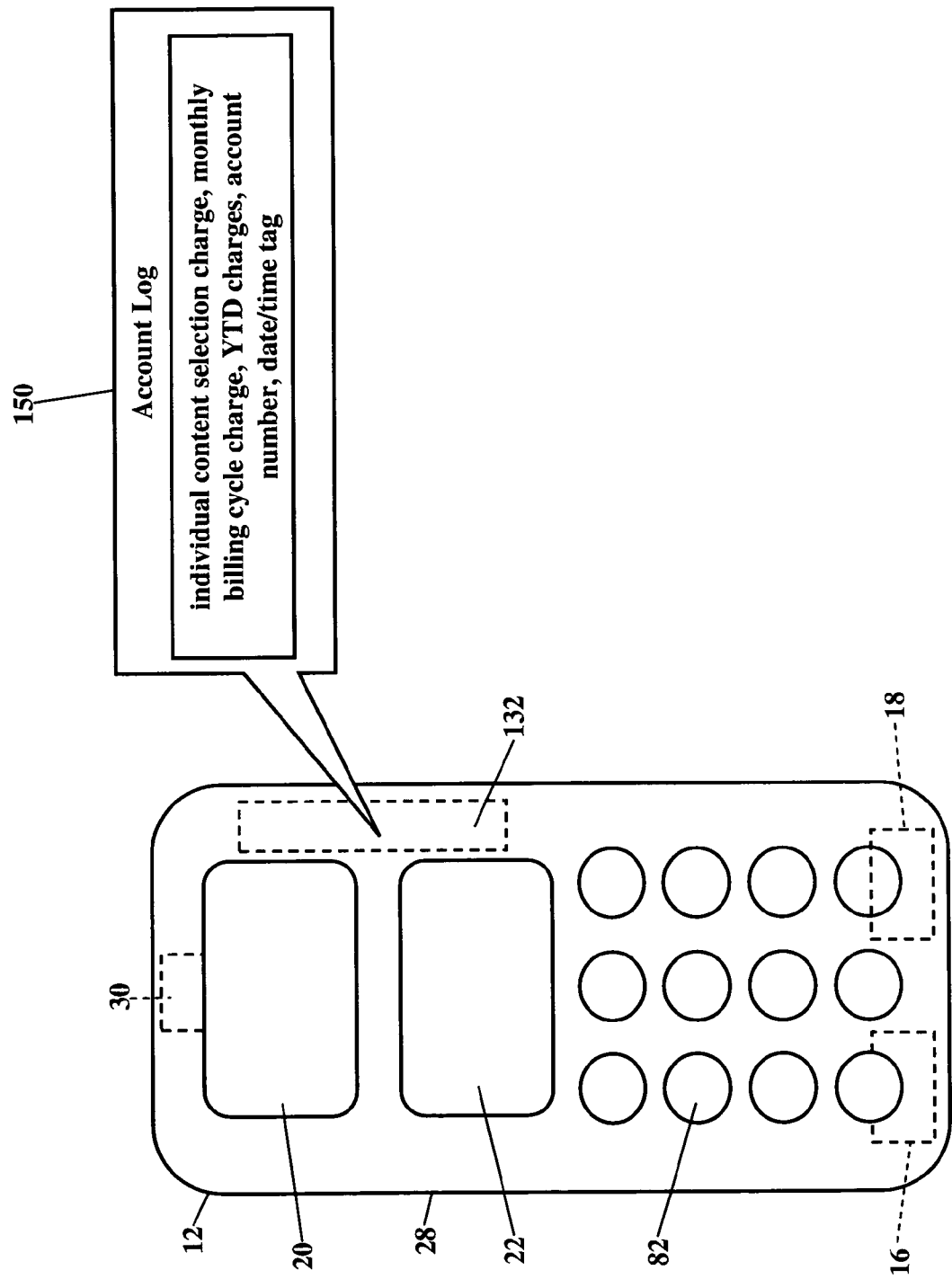

FIG. 12 is a schematic illustrating an account log 150, according to exemplary embodiments. A common complaint from users is that they rarely know the status, current charges, and other account information. Users often have no idea of how much content they have requested, the charges for that content, and their account's current charges. The account log 150, however, maintains a local billing record for each subscriber account. The account log 150 is stored in the memory 132 and informs the user of their currently monthly charges, year-to-date charges, and other billing and account information. Because the content log 130 maintains an entry or record for each content selection, the account log 150 includes the charges for each content selection. The account log 150 also maintains a running total for each billing cycle. The account log 150 may even use data from the content log 130 to tag each charge with a date, time, duration, user, title or description of the requested content, and other information.

Figure 13:
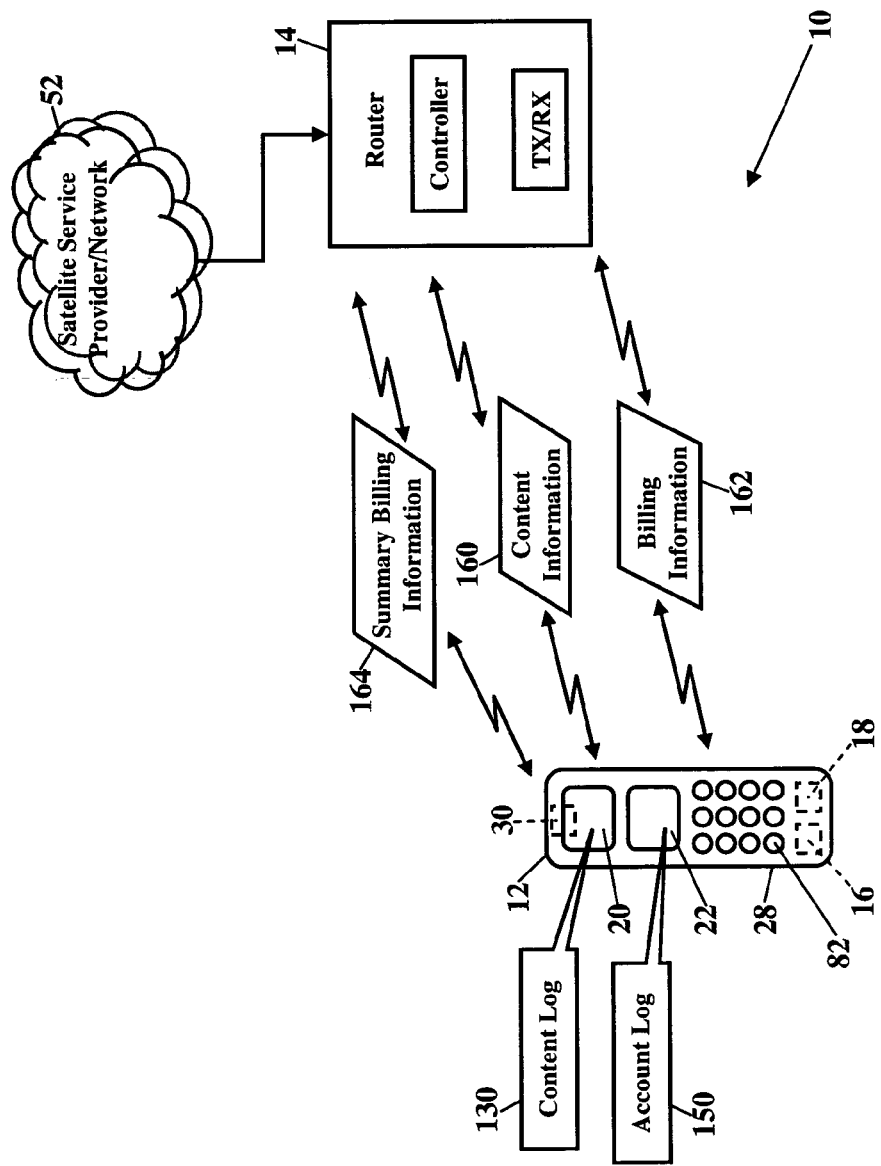

FIG. 13 is a schematic illustrating transfer of the content log 130 and/or the account log 150, according to exemplary embodiments. Here the remote control 12 wirelessly transfers information regarding the content log 130 and/or the account log 150 to one or more of the service providers. The processor 30, for example, may periodically command transmission of content information 160 and/or billing information 162 to the wireless router 14. If, for example, the content information 160 and/or the billing information 162 pertains to the satellite service provider 52, the processor 30 addresses packets of information to the satellite service provider 52. If, however, the content information 160 and/or the billing information 162 pertains to any other content provider (such as the wireless/broadcast source 44, the cable service provider 48, the broadband service provider 56, or even the local sources 60 shown in FIGS. 2 and 3), the processor 30 addresses packets of information to the content provider. Each content provider may alternatively or additionally command or "ping" the remote control 12 and request a transfer of the content information 160 and/or the billing information 162. The remote control 12 would then upload the information 160 and/or 162 to the content provider. Each content provider may also periodically communicate summary billing information 164 to the remote control 12. The remote control 12 would then use the summary billing information 164 to construct the content log 130 and/or the account log 150.

Figure 14:
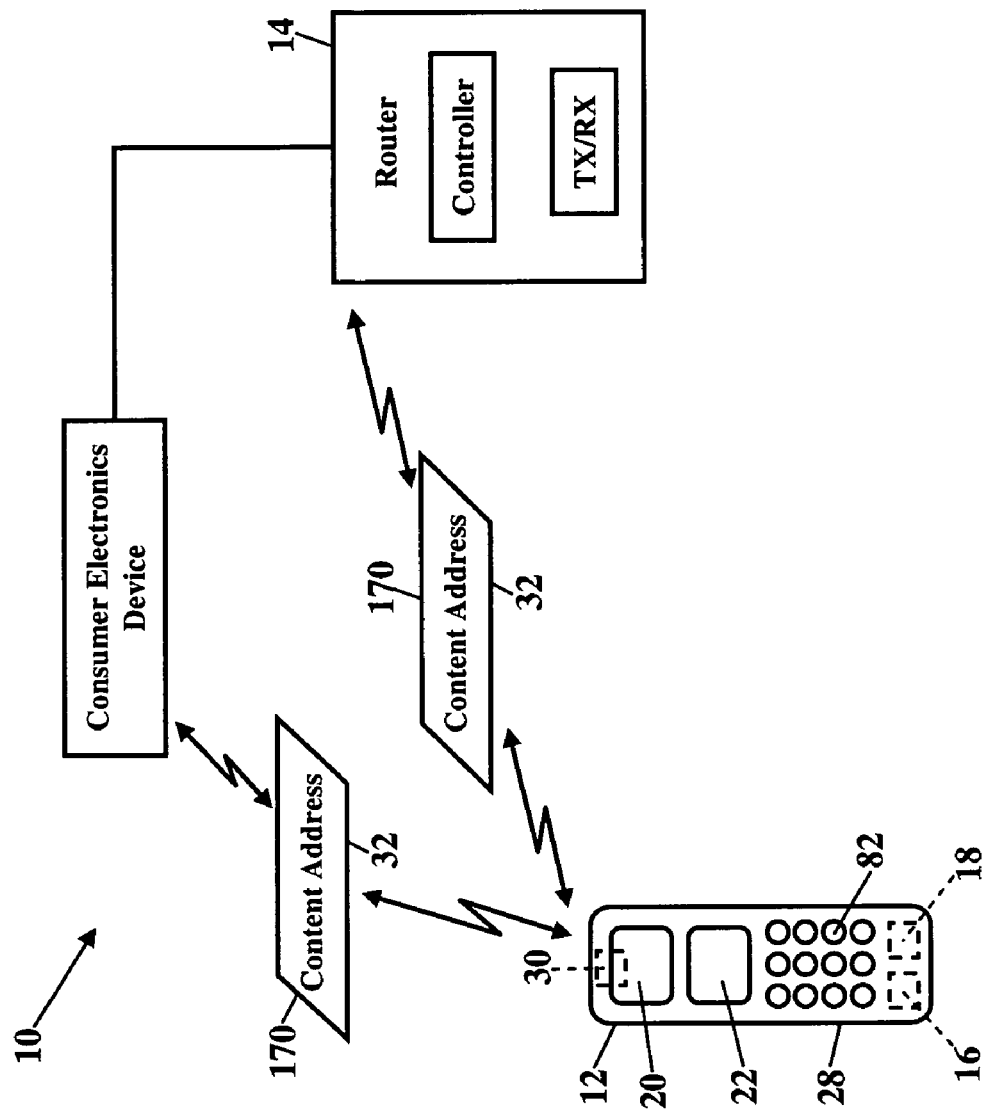
FIG. 14 is a schematic illustrating a content address, according to exemplary embodiments.

FIG. 14 is a schematic illustrating a content address 170, according to exemplary embodiments. The content address 170 redirects the consumer electronic device 34 to an I.P. address or other communications address. The remote control 12, as earlier explained, has multiple transceivers simultaneously receiving multiple streams of content. The remote control 12 also has multiple displays simultaneously presenting the streams of content. At some time the user may wish to command the consumer electronic device 34 to begin receiving one or more of the streams of content. The user, for example, may desire to view a particular stream of content on a large-screen display/monitor. The user enters a command, or a sequence of commands, that communicates the content address 170 to the consumer electronic device 34. The content address 170 is an I.P. address or other communications address from which the particular stream of content may be obtained (e.g., downloaded). The content address 170 is communicated as the control signal 32. The control signal 32, with the content address 170, redirects the consumer electronic device 34 to request the particular stream of content. The content address 170 may resemble a Uniform Resource Locator (URL) for the desired stream of content.

Figure 15:
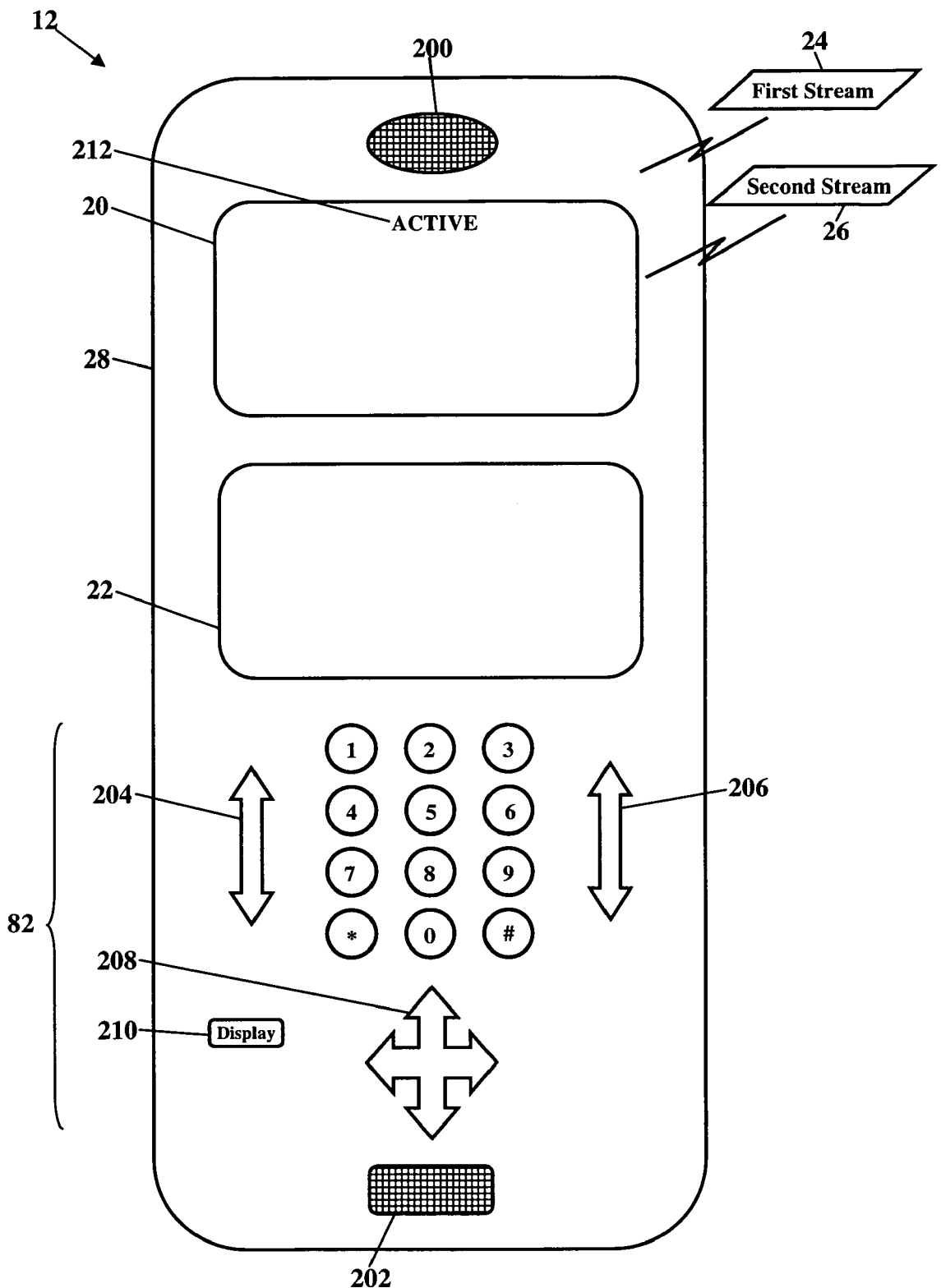
FIGS. 15 and 16 are schematics illustrating exterior views and additional features of the remote control shown in FIGS. 1-14.

FIG. 15 is a schematic illustrating an exterior view of the remote control 12 shown in FIGS. 1-14. Although the remote control 12 includes multiple displays, FIG. 15, for simplicity, only illustrates the first display 20 and second display 22. The first display 20 is dedicated to displaying the first stream 24 of content, while the second display 22 is dedicated to simultaneously displaying the second stream 26 of content. The first 20 and second 22 displays are shown as physically separate display devices housed within the same outer casing 28. The outer casing 28 may have any size and shape, but the outer casing 28 is preferably sized such that the displays 20 and 22 appeal to consumers. That is, the displays 20 and 22 should be large enough such that a viewer may readily identify the displayed content. The displays 20 and 22, for example, could be two inches (2 in.) in height and four inches (4 in.) in width. Larger or small displays, and thus a larger or smaller casing 28, are possible.

As FIG. 15 illustrates, the remote control 12 includes other componentry. The remote control 12 includes the keypad 82, a speaker 200, and a microphone 202. The first 22 and second 24 displays may be cathode ray tubes, liquid crystal displays, plasma displays, or any other means for displaying video and/or graphical content. The keypad 82 may include at least ten (10) buttons (numerically labeled "0" through "9") and may also include buttons labeled "*" and "#." The keypad 82 may also include buttons with alphabetical designations, and/or the keypad 82 could include function buttons that permit a single button to represent one or more alphanumeric characters. The keypad 82 may also include a set 204 of channel buttons and a set 206 of volume buttons. The set 204 of channel buttons allows the user to advance or decrement a channel selection, while the set 206 of volume buttons allows the user to increase/decrease volume. A set 208 of scroll buttons allows the user to scroll in an up, down, left, and right direction along either display 20 or 22. A joystick could, instead, allow the user to enter scrolling movements. The keypad 82 may also include any number of auxiliary buttons, such as a "last channel" command, a "favorite channel" command, a "guide" or "schedule" button for viewing a programming schedule, and a "yellow pages" button (perhaps having a yellow color) for commanding receipt of a Yellow Pages channel. The keypad 82 may additionally or alternatively include other buttons with various functions and/or commands, and the remote control 12 may be programmed to recognize commands having sequences of buttons.

The remote control 12 may also include a display selector switch 210. The display selector switch 210 allows the user to select which display (20 or 22) is affected by commands. The display selector switch 210, for example, determines which display produces the scrolling motions entered using the set 208 of scroll buttons. Similarly, the display selector switch 210 also determines which display receives/displays channel changes, keypad commands, and other functions or entries. If, for example, the user wishes to change the content being displayed on the first display 20, the user first depresses the display selector switch 210. A graphical indication 212 is displayed on the first display 20, and the graphical indication 212 informs the user of the active display. FIG. 15 shows the graphical indicator 212 as the text message "ACTIVE," although any text may be used. The display selector switch 210 is shown as a single button that is used to toggle between displays. A first depression of the display selector switch 210 would correspond to the first display 20, while a second depression would correspond with the second display 22. Additional depressions of the display selector switch 210 correspond to additional displays, if any. The display selector switch 210 may alternatively be a multiple-position switch, with each position corresponding to a particular display. The remote control may alternatively or additionally include a graphical menu that is presented on any display, and the graphical menu allows the user to select the desired display.

The remote control 12 may also include means for switching between multiple sources. As the above paragraphs explained, the remote control 12 may receive and display content from multiple sources (such as the wireless/broadcast source 44, the cable service provider 48, the satellite service provider 52, the broadband service provider 56, or even the local sources 60 shown in FIGS. 2 and 3). The means for switching between these multiple sources allows the user to request what content is displayed by the first display 20 and what content is displayed by the second display 22. The means for switching between these multiple sources allows the user to select a source for the first stream 24 of content and a source for the second stream 26 of content.

Figure 16:
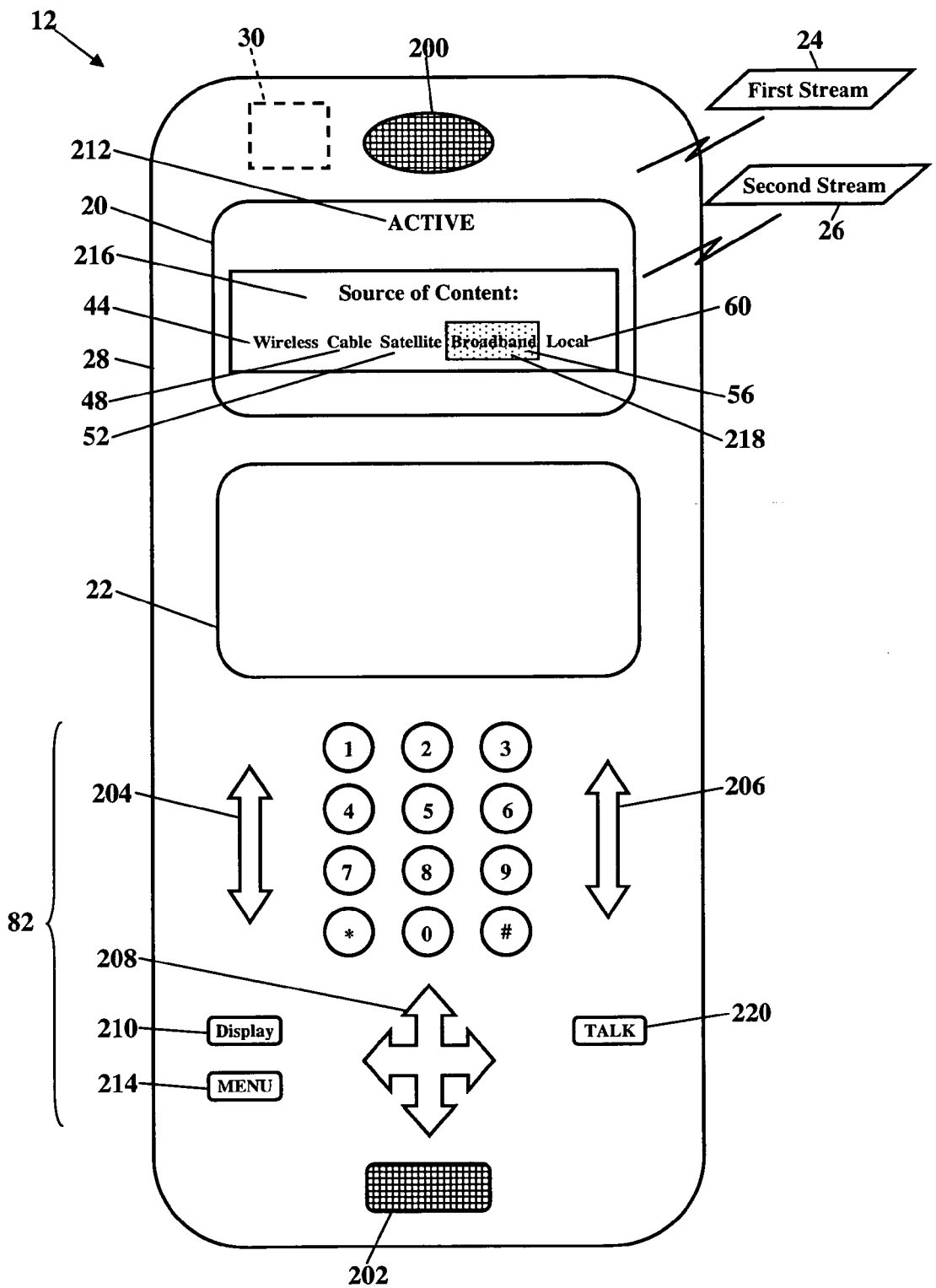

FIG. 16 is a schematic illustrating the means for switching, according to more exemplary embodiments. Here the means for switching is illustrated as a "Menu" button 214. The keypad 82 includes this "Menu" button 214 that, when depressed, produces a graphical menu 216 in the active display (as indicated by the graphical indication "ACTIVE"). The graphical menu 216 visually and/or audibly presents options for switching between multiple sources of content. That is, the graphical menu 216 allows the user of the remote control 12 to select a source for any of the multiple streams of content (such as the first stream 24 of content or the second stream 26 of content). As FIG. 16 illustrates, the graphical menu 216 presents options for selecting content from the wireless/broadcast source 44, from the cable service provider 48, from the satellite service provider 52, from the broadband service provider 56, or from the local source 60. The user may then use the set 208 of scroll buttons to scroll along the menu 216 and to select the source of content to be received and presented on the first display 20. FIG. 16, for example, shows the broadband service provider 56 as a highlighted cell 218.

The graphical menu 216 may include submenus. Should the user select the wireless/broadcast source 44, a submenu is produced that provides additional selections. The wireless/broadcast source 44, for example, may be chosen from a broadcast wireless source (such as broadcast television, radio, or other), a Wi-Fi or BLUETOOTH® source, an I.E.E.E. 802 source, or some other wireless source. Whatever wireless sources or networks that a transceiver may access would be listed. Should the local source 60 be selected, similar submenus are presented for specifying a local storage device, a DVD source, a CDROM source, or other local source. Similar submenus may be available for the other content sources.

The means for switching could include other configurations. One or more multiple position switches (e.g., rotary switches, slide switches) could additionally or alternatively be used to select between multiple sources of content. The means for switching could alternatively or additionally include a sequence of pushed buttons on the keypad 82 that invokes screen modes and/or the menu 216. One or more lights (such as a light emitting diode or a backlit button) could visually indicate the active display, the current mode, and/or the content source.

The remote control 12 may also include other features. The remote control 12, for example, may include a "TALK" button 220. The remote control 12, as earlier described, may initiate an outgoing voice/video call. Should the user wish to place an outgoing call, the user depresses the "TALK" button 220. The user may then use the keypad 82 and enter a telephone number or other communications address. The user may alternatively access menus that list previously received calls, missed calls, contact lists, favorites, and other numbers, as is currently known. When the "TALK" button 220 is depressed, the processor 30 causes any idle transceiver to initiate the outgoing call. Should all transceivers be engaged in a stream session, the processor 30 prompts the user to terminate a stream of content. After the user responds, the processor 30 terminates that stream of content and commands the now-idle transceiver to handshake and to wirelessly communicate the outgoing call to the wireless router (shown as reference numeral 14 in FIGS. 1-3).

Figure 17:
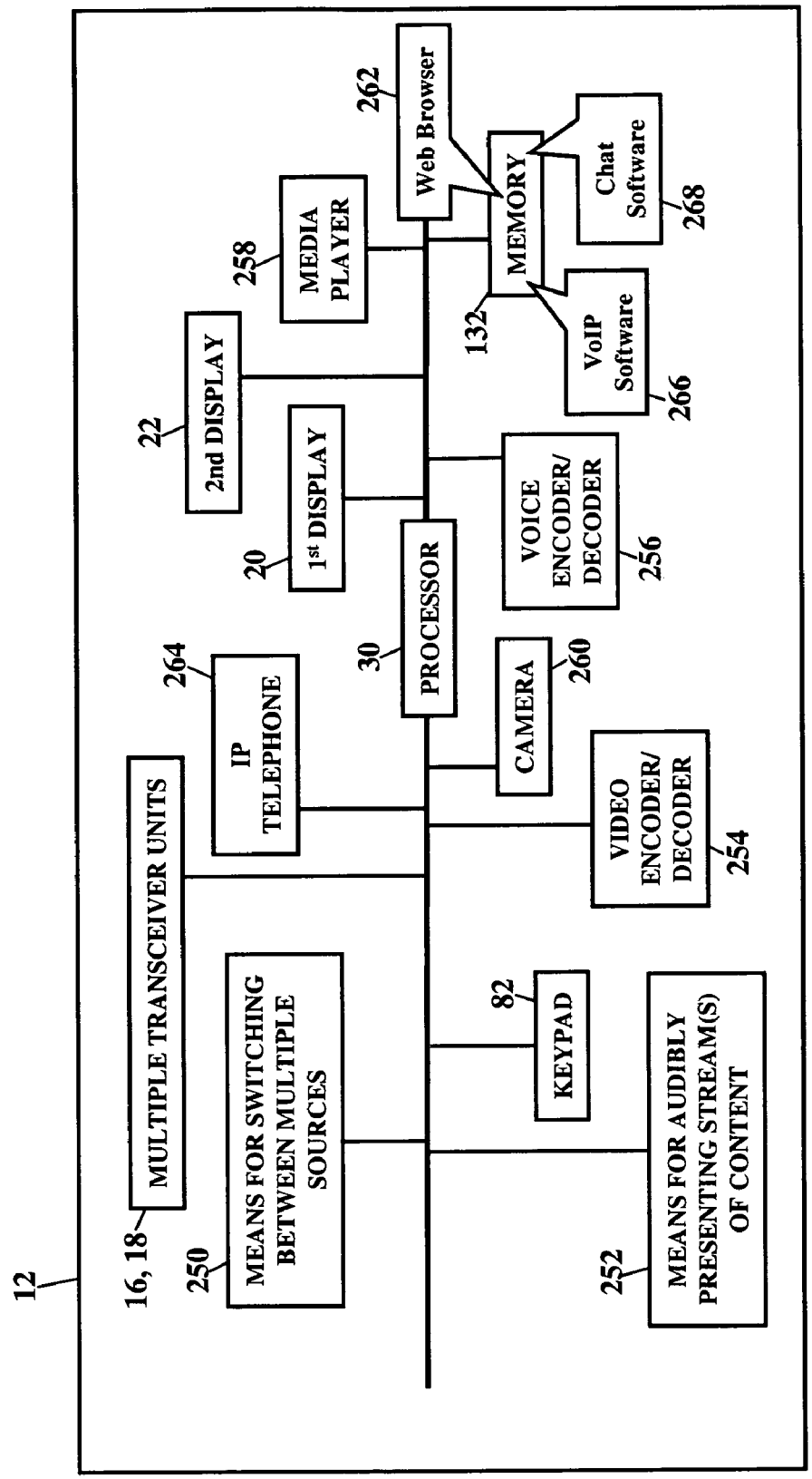
FIG. 17 is a block diagram of the remote control shown in FIGS. 1-16, according to exemplary embodiments.

FIG. 17 is a block diagram of the remote control 12 shown in FIGS. 1-16, according to exemplary embodiments. The remote control 12 includes the processor 30 interfacing with the multiple displays (such as the first display 20 and the second display 22) and the keypad 82. The processor 30 also interfaces with the means 250 for switching between the multiple sources of content. Each of the multiple transceivers (such as the first transceiver unit 16 and the second transceiver 18) interface with the processor 30 and receives the multiple streams of content (such as the first stream 24 of content and the second stream 26 of content shown in FIGS. 1-3). Any of the multiple transceiver units may also wirelessly send the control signals (shown as reference numeral 32 in FIGS. 1-3). The remote control 12 includes means 252 for audibly presenting one or more streams of content. The means 252 for audibly presenting a stream of content may include the speaker (shown as reference numeral 200 in FIGS. 15 and 16), a piezoelectric element, and/or any other device that emits sounds. The remote control 12 may also include a video encoder/decoder 254 for decoding video signals, a voice encoder/decoder 256 for encoding and/or decoding voice signals, and a media player 258 for executing media files. The remote control 12 may include camera circuitry 260 for capturing digital images and video (such as still photos, movies, and video calls). A web browser 262 may be stored in memory 132, and the web browser 262 allows navigation of local and remote content destinations. The remote control 12 may also include an Internet Protocol telephony unit 264 and/or Voice over Internet Protocol (VoIP) client software 266 for processing of telephony signals. The Internet Protocol telephony unit 264 and/or the Voice over Internet Protocol (VoIP) client software 266 handles telephony signaling (e.g., for incoming call handling or call origination) and decodes digitally encoded voice. Chat software 268 enables and controls text chat sessions and/or video chat sessions. When the chat software 268 enables and controls a video chat session, the chat software 268 interfaces with the camera circuitry 260. While the processor 30 is shown as a component distinct from the other components in FIG. 17, it should be appreciated that the processor and one or more of the components shown in FIG. 17 may be integrated within the same component.

The processor 30 may be implemented with a digital signal processor (DSP) and/or a microprocessor. Advanced Micro Devices, Inc., for example, manufactures a full line of microprocessors (Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Texas Instruments offers a wide variety of digital signal processors (Texas Instruments, Incorporated, P.O. Box 660199, Dallas, Tex. 75266-0199, Phone: 972-995-2011, www.ti.com) as well as Motorola (Motorola, Incorporated, 1303 E. Algonquin Road, Schaumburg, Ill. 60196, Phone 847-576-5000, www.motorola.com). There are, in fact, many manufacturers and designers of digital signal processors, microprocessors, controllers, and other componentry that are described in this patent. Those of ordinary skill in the art understand that this componentry may be implemented using any suitable design, architecture, and manufacture. Those of ordinary skill in the art, then understand that this invention is not limited to any particular manufacturer's component, nor architecture, nor manufacture.

Exemplary embodiments may be physically embodied on or in a transitory or non-transitory computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000,). This computer-readable medium, or media, could be distributed to end-users, licensees, and assignees. These types of computer-readable media, and other types not mention here but considered within the scope of the exemplary embodiments, allow the calendaring application to be easily disseminated. A transitory or non-transitory computer program product for remotely controlling consumer electronics devices comprises a computer-readable medium storing computer code. The computer code simultaneously receives at a transceiver multiple streams of content. The computer code simultaneously presents the streams of content at multiple display areas. The computer code controls display of the received multiple streams of content on the multiple display areas.

While exemplary embodiments of the present invention have been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A hand-held remote control for remotely controlling a consumer electronics device, the hand-held remote control comprising:
    a processor executing code stored in memory that causes the processor to:
    simultaneously receive multiple and separate streams of video content at multiple transceivers of the hand-held remote control, the hand-held remote control remotely controlling a consumer electronics device;
    simultaneously present the multiple and separate streams of video content at multiple display devices housed within an outer casing of the hand-held remote control with each display device dedicated to displaying a different one of the multiple and separate streams of video content;
    control display of the multiple and separate streams of video content on the multiple display devices;
    individually adjust a volume of an audible portion of each stream of video content received at the hand-held remote control;
    receive an indication of an incoming communication;
    display a prompt on a display device of the hand-held remote control to alert of the incoming communication;
    determine that all the multiple and separate transceivers are unavailable to receive the incoming communication;
    receive a user's selection to terminate content being displayed on a display device;
    terminate receipt of a stream of video content at one of the multiple transceivers that corresponds to the user's selection to make a transceiver available to receive the incoming communication; mute audible portions of all remaining streams of video content being received at the hand-held remote control; and
    receive the incoming audible communication at the transceiver.

2. The hand-held remote control according to claim 1, further comprising means for switching between multiple sources for each stream of video content displayed on each display device.

3. The hand-held remote control according to claim 2, wherein the means for switching between the multiple sources comprises selections for any two of:
    i) wireless content from a wireless source;
    ii) cable content from a cable service provider;
    iii) satellite content from a satellite service provider;
    iv) broadband content from a broadband service provider;
    v) local content from a local source; and
    vi) Internet content from an Internet Service Provider.

4. The hand-held remote control according to claim 1, wherein the code further causes the processor to visually display another prompt that requests to terminate receipt of the stream of video content.

5. The hand-held remote control according to claim 1, further comprising means for audibly presenting any stream of video content, such that any stream of video content may be chosen and audibly presented.

6. The hand-held remote control according to claim 1, wherein the code further causes the process to automatically send a control signal to mute the consumer electronics device.

7. A method, comprising:
    simultaneously receiving multiple and separate streams of video content at multiple transceivers of a handheld remote control, the handheld remote control remotely controlling a consumer electronics device;
    simultaneously presenting the multiple and separate streams of video content at multiple display devices housed within an outer casing of the handheld remote control with each display device dedicated to displaying a different one of the multiple and separate streams of video content;
    controlling display of the multiple and separate streams of video content on the multiple display devices;
    individually adjusting a volume of an audible portion of each stream of video content received at the handheld remote control;
    receiving an indication of an incoming communication;
    displaying a prompt on a display device of the handheld remote control to alert of the incoming communication;
    determining that all the multiple transceivers of a handheld remote control are unavailable to receive the incoming communication;
    receiving a user's selection to terminate content being displayed on a display device;
    terminating receipt of a stream of video content at one of the multiple transceivers that corresponds to the user's selection to make a transceiver available to receive the incoming communication;
    muting audible portions of all remaining streams of video content being received at the handheld remote control; and
    receiving the incoming communication at the transceiver.

8. The method according to claim 7, further comprising switching at the remote control between multiple sources for each stream of video content displayed on each display area.

9. The method according to claim 7, further comprising muting the audible when a voice over internet protocol telephone call is received at the transceiver.

10. The method according to claim 7, further comprising visually displaying a prompt that requests to terminate receipt of the stream of video content.

11. The method according to claim 7, further comprising audibly presenting any stream of video content, such that any stream of video content may be chosen and audibly presented.

12. The method according to claim 7, further comprising automatically causing a control signal to be sent to mute the consumer electronics device.

13. A non-transitory computer program product comprising a computer readable medium storing processor executable instructions for performing a method, the method comprising:
- simultaneously receiving multiple and separate streams of video content at multiple transceivers of a handheld remote control, the handheld remote control remotely controlling a consumer electronics device;
- simultaneously presenting the multiple and separate streams of video content at multiple display devices housed within an outer casing of the handheld remote control with each display device dedicated to displaying a different one of the multiple and separate streams of video content;
- controlling display of the multiple and separate streams of video content on the multiple display devices;
- individually adjusting a volume of an audible portion of each stream of video content received at the handheld remote control;
- receiving an indication of an incoming communication;
- displaying a prompt on a display device of the handheld remote control to alert of the incoming communication;
- determining that all the multiple transceivers of the handheld remote control are unavailable to receive the incoming communication; receiving a user's selection to terminate content being displayed on a display device;
- terminating receipt of a stream of video content at one of the multiple transceivers that corresponds to the user's selection to make a transceiver available to receive the incoming communication;
- muting audible portions of all remaining streams of video content being received at the handheld remote control; and
- receiving the incoming audible communication at the transceiver.

14. The computer program product according to claim 13, further comprising processor executable instructions for switching between multiple sources for each stream of video content displayed on each display device.

15. The computer program product according to claim 13, wherein receiving the indication of the incoming communication comprises receiving the indication of an incoming voice call.

16. The computer program product according to claim 13, further comprising processor executable instructions for when the indication is received, then automatically causing a control signal to be sent to mute the consumer electronics device.

* * * * *